United States Patent Office 3,164,832
Patented Jan. 5, 1965

---

3,164,832
IF SIDELOBE CANCELLATION
Arthur A. Varela, Alexandria, Va., assignor, by mesne assignments, to the United States of America as represented by the Secretary of the Navy
Filed Dec. 26, 1962, Ser. No. 247,413
10 Claims. (Cl. 343—17.1)

The present invention relates to radar jamming countermeasures, and more particularly to systems for avoiding the deleterious effects of noise modulated CW jamming signals in radar systems.

It is known that noise modulated CW jamming signals, if sufficiently strong, can penetrate the side and backlobes of a radar antenna and clutter its receiver output so that for all or a large part of a three hundred and sixty degree scan only very strong target echoes can be detected. As seen from the radar receiver output, noise jamming may be regarded as the same as a large increase in the receiver noise. Signals that were near the threshold of the radar receiver before the reception of a jamming signal cannot be detected in the presence of the jamming signal. If these signals are to be detected at all, some method of canceling or attenuating the jamming signal without unduly reducing the desired signal strength is necessary. Although various attempts have been made at designing a detection system which will operate satisfactorily in the presence of side and backlobe noise jamming, none up to the present time have been successful to any great degree. It is toward the solution of this problem that the present invention is directed.

It has been found that while it may not be possible to prevent jamming within the main beam sector, that is, where the beam is pointed directly toward or at the jammer, jamming elsewhere in the pattern can be avoided according to the present invention by a technique using in addition to the regular radar receiver of the system, an auxiliary receiver having an omnidirectional antenna. In that jamming signals come from the same source, jamming signals appearing in the auxiliary omnidirectional receiver and in the regular radar receiver are fully coherent. Thus a phase shift of 180 degrees in the jamming signal between the auxiliary receivers results in cancelation of the jamming signal. Echo signals received in the radar beam from the direction other than that of the jammer are much stronger. Therefore, it is desirable to equalize the two signal levels for effective cancelation, and a phase shift of exactly 180 degrees is necessary for complete cancellation.

Accordingly, it is an object of the present invention to provide for the cancellation of jamming signals received in a radar system.

It is another object of the present invention to provide for the cancellation of noise modulated CW jamming signals which have penetrated through the back and side lobes of a radar antenna.

Another object of the present invention is the provision of means which may be coupled to existing radar systems for providing for the cancellation of noise modulated CW jamming signals.

Another object of the present invention is the provision of means for eliminating the need for accurate phase control devices in systems for suppressing or canceling jamming signals.

Yet another object of the present invention is the provision of an auxiliary omnidirectional receiver which may be coupled to a radar receiver whereby cancellation of jamming signals is obtained prior to signal detection.

These and other objects, features and advantages of the present invention will be better understood by referring to the accompanying drawings in which.

Figure 1:
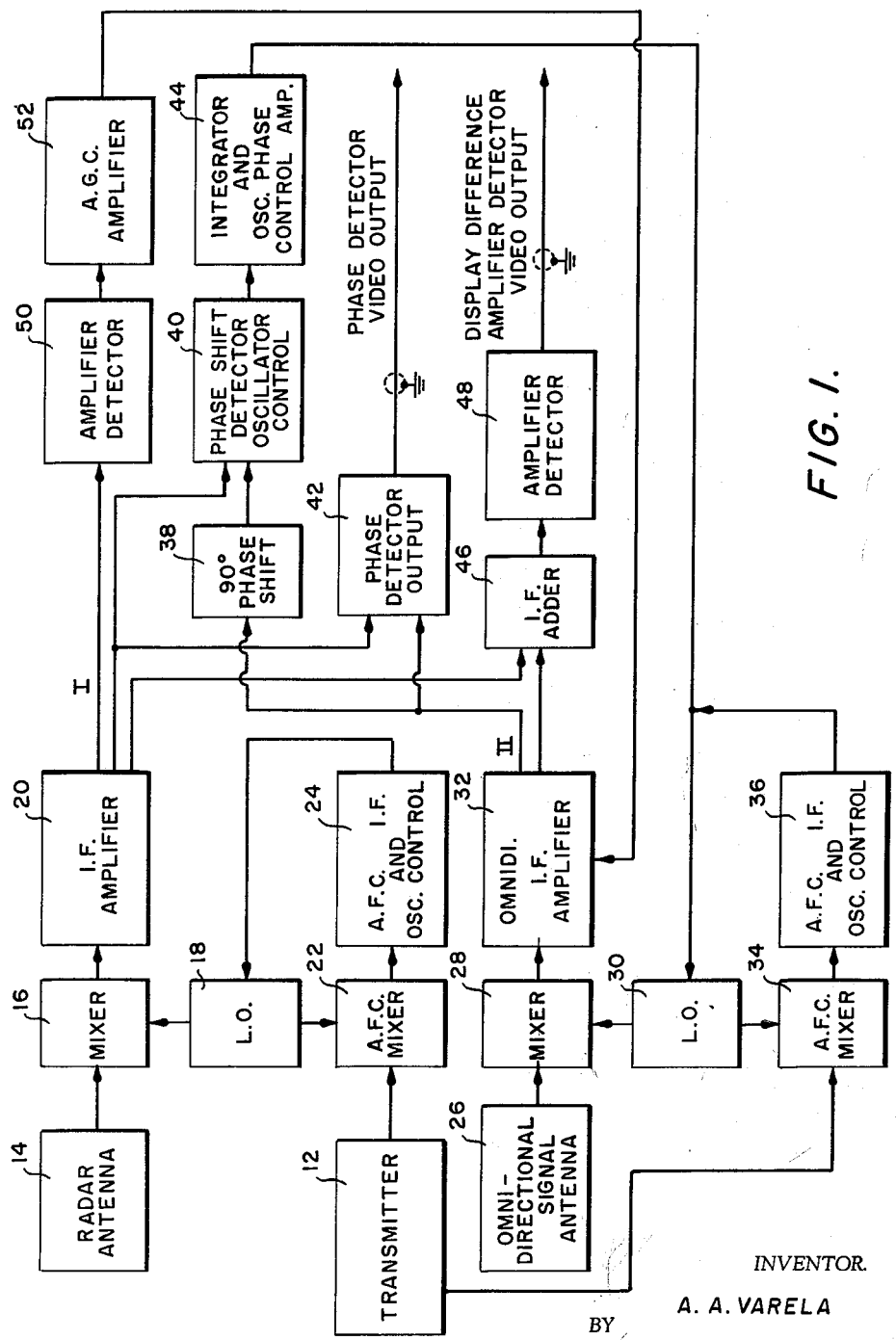
FIG. 1 is a schematic block diagram of an embodiment of the invention.

Referring to the schematic block diagram of FIG. 1, a pulse type radar system is shown therein and includes a radar transmitter unit 12 and a radar antenna 14 which receives pulses in return echo form from any targets which may be within the range of the radar transmitter 12. As is conventional, the output of the radar antenna 14 is fed to a mixer 16, and the output of a local oscillator 18 for the radar system is applied to the mixer 16 to provide a resulting intermediate frequency signal which is then fed to an intermediate frequency amplifier 20 of any suitable conventional construction. The signal information which may be present in the output of the intermediate frequency amplifier 20 will, for the sake of convenience be represented by channel I.

The output of the local oscillator 18 is also fed to the automatic frequency control mixer 22 so that at the mixer 22 a small fraction of the radio frequency energy of the transmitter 12 is combined with the output of the local oscillator 18 to provide an output control voltage which is then fed to an automatic frequency controlled intermediate frequency and oscillator control unit 24 of conventional construction. The intermediate frequency energy resulting from the mixing of the local oscillator and radio frequency energy pulses in the mixer 22 is amplified, rectified, and applied as an output from the oscillator control unit 24 to the local oscillator 18 so that the local oscillator may be maintained at the correct local oscillator frequency and prevent drifting thereof. The control of the frequency of the local oscillator 18 may be implemented through any suitable means, such as, a reactance control circuit.

According to the invention, there is also provided an omnidirectional signal antenna 26 which is capable of receiving not only return signals but also noise modulated CW jamming signals from any direction. The omnidirectional signal from antenna 26 is fed to a mixer 28. A local oscillator 30 produces an output which is combined with the signal input from the omnidirectional signal antenna 26 in mixer 28, thereby providing an intermediate frequency signal which is fed to an omnidirectional intermediate frequency amplifier 32. The output path of the intermediate frequency amplifier 32 will, for the sake of convenience, be referred to as the omnidirectional channel II.

The output of the local oscillator 30 is also fed to the automatic frequency control mixer 34 so that at the mixer 34 a small fraction of the radio frequency energy of the transmitter 12 is combined with the output of the local oscillator 30 to provide an output control voltage which is fed to an automatic frequency controlled intermediate frequency and oscillator control unit 36 of conventional construction. The resulting intermediate frequency energy from the mixing of these two frequencies is amplified, rectified, and applied to any suitable control circuits which are located in an automatic frequency control intermediate frequency and oscillator control unit 36 receiving the output of the mixer 34. The output of the oscillator control unit 36 is then fed back to suitable reactance tube or variable capacitance circuit means and coupled in any suitable manner to the local oscillator unit 30 so that drifting of the oscillator 30 is prevented.

It will be recalled that it is desired to provide 180 degree phase cancellation between the noise modulated CW jamming signal components between the channels I and II. In order to carry this out, it is necessary to provide between the channels a sense of phase direction in order to tune to this 180 degree phase difference. Thus, there is provided a 90 degree phase shift unit 38 which receives the output of the omnidirectional intermediate frequency amplifier unit 32. The output of the intermediate frequency amplifier 20 is applied to a phase shift detector and local oscillator control unit 40 and also to a phase detector output unit 42. The output of the phase shift detector and local oscillator control unit 40 is fed to an integrator and oscillator phase control amplifier 44, the output of which is applied to the local oscillator unit 30 of channel II.

It will thus be understood that a feed back control loop is provided which includes the path from the amplifier unit 32 through the phase shift unit 38, the phase detector unit 40 and the integrator and oscillator phase control amplifier 44 to the local oscillator unit 30 of channel II. The purpose of this feed back loop is to control the phase of the local oscillator 30 of the omnidirectional receiver by means of causing changes in the frequency of said local oscillator. By momentarily changing the frequency of the local oscillator 30, even very slightly, for example, within the band pass range of the intermediate frequency amplifier 32, many degrees in relative phase between the two signals of channels I and II respectively can be achieved. It is, of course, to be understood that phase control may also be carried out with conventional line stretchers wherein the signal path length is actually or effectively changed. However, it is preferred in the present invention to employ the foregoing described system of transient changes in local oscillator frequency.

The output of the integrator and oscillator phase control amplifier 44 is in the form of a varying direct current voltage. An increase in voltage input to the local oscillator 30, which input may be applied to a reactive type tube or variable capacitor circuit in the same manner as previously described for receiving the output of the oscillator control unit 36, results in a decrease in local oscillator frequency. As shown in the graph of FIG. 2, which is a plot of amplitude vs. phase between channels I and II, a decrease in the amplitude of the D.C. voltage fed from the integrator and oscillator phase control amplifier 44 results in an increase in local oscillator frequency.

The respective outputs of both intermediate frequency amplifiers 20 in channel I, and 32 in channel II, are also applied to a phase detector output unit 42. The output of the unit 42 may then be utilized for a video signal at the output for display. The response plotted in FIG. 2 may be such that full amplitude in the display from phase detector 42 is provided when the signals of channels I and II are in phase, and zero amplitude when signals of channels I and II are of 180 degrees out of phase.

Figure 2:
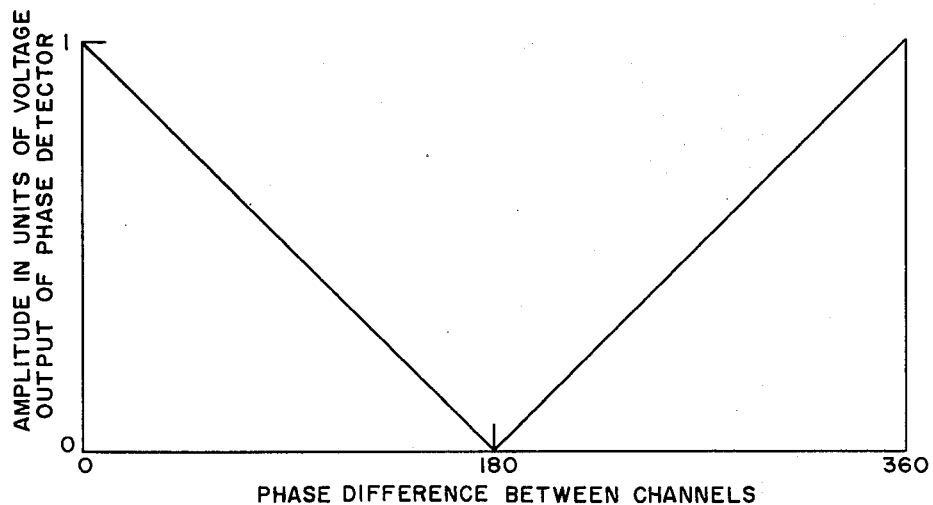
FIGS. 2 and 3 are explanatory graphs for explaining the principles of operation of the present invention.
Figure 3:
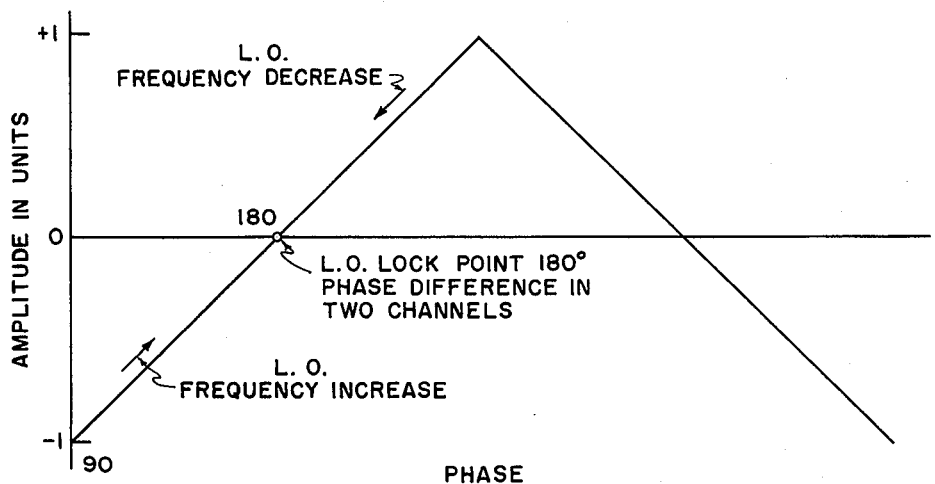

The type of phase response shown in FIG. 2 is not, however, suitable for use with the control of the local oscillator 30 because it does not impart tuning sense or direction for the local oscillator 30. Referring to FIG. 3, there is shown an oscillator control phase detector response in which a 180 degree phase shift between the two channels results in a zero output of the phase detector 40 and a phase shift either above or below 180 degrees results in plus or minus voltage output of the phase detector 40. It is the utilization of the 90 degree phase shaft unit 38 that provides the difference in response between the phase detector units 40 and 42.

The response curve of the phase shift detector 40 and local oscillator control unit 30, shown in FIG. 3, is seen to be a triangular shaped response curve having a 180 degree lock point representing the local oscillator lock point when there is a 180 degree phase difference between the two channels. The ordinate axis in the graph FIG. 3 indicates the amplitude in units and the abscissa indicates the phase. As an example, if the phase difference between the channels I and II is 200 degrees, the local oscillator 30 will be controlled to decrease in frequency as a transient and bring the phase shift between the two channels back to 180 degrees. If the phase shift or difference between the two channels is in the vicinity of 360 degrees such that the output would be on the other side of the peak of the triangular response curve shown in FIG. 3, the local oscillator 30 is supplied with a control voltage which tends to decrease the frequency of the local oscillator 30, thus reducing the phase, passing the hump of the phase detector response curve, and shifting back in a direction from right to left to the 180 degree lock-on point. In the same manner, if the output of the integrator and oscillator phase control amplifier 44 is negative and indicating a phase difference of greater than 360 degrees between channels I and II, it controls the local oscillator 30 through the negative hump of the response curve to return to the lock-on point.

By means of a control path including the 90 degree phase shift unit 38, phase detector and control unit 40, integrator 44, and the local oscillator 30 of the omnidirectional channel II (which may be referred broadly as a phase detector servo loop), the jamming signals applied or reaching the two channels I and II are shifted in phase so that they are 180 degrees out of phase with respect to each other, and when fed into the output phase detector 42, for display, are seen to be canceled. Therefore, the noise jamming that has entered into the system as a whole through the antenna side lobes is eliminated or suppressed.

The outputs of the intermediate amplifiers 20 and 32 respectively are also fed to an intermediate frequency adder unit 46. Since eventually the outputs of the amplifiers 20 and 32 are exactly 180 degrees out of phase because of noise cancellation provided by the phase detector servo loop, the signals applied to the adder 46 are at least substantially free of noise. The resultant noise-free signal from the intermediate frequency adder is then fed to an amplifier detector 48 so that the resulting radar target information may be displayed in any suitable manner.

It is desirable that the off-axis jamming signals in channels I and II be as near the same amplitude as possible to prevent noise signals from reaching the display output of the amplifier detector 48. Since the radar receiver 14 side lobe pattern is not constant but has peaks and nulls, the amplitude of the signals received in channel I will vary in amplitude in accordance with the antenna side lobe pattern. In order for thes ignal cancellation to be carried out, it is thus necessary to employ some form of automatic gain control.

In one form of automatic gain control, there is employed an amplifier detector 50 which receives the output of the intermediate frequency amplifier 20. The output of the amplifier detector 50, which represents a video signal, is fed to an automatic gain control amplifier 52 which serves to smooth the signal by means of a time constant circuit, and translates said signals into varying D.C. voltages to vary the gain of the omnidirectional intermediate frequency amplifier 32. In this manner, as the signal level in the radar channel I then becomes weaker, the gain control in the omnidirectional channel II will be reduced, thus tending to maintain amplitudes relatively constant.

Of course, when a radar target echo signal is received in the main radar beam it also appears in the omnidirectional channel II, but at much lower amplitude than in channel I because the automatic gain control has too long a response time to act appreciably during the pulse signal. This relationship between amplitudes and the channels may be illustrated in the following example:

The instantaneous signals introduced to the phase detector 40 may be expressed as $$e_o = e_j G_o \sin wt + e_t G_o \sin (wt + \phi)$$
$$e_r = -e_j G_j \sin wt - e_t G_t \sin (wt + \phi)$$

where:

$e_o$ = the omni channel signal
$e_r$ = radar channel signal
$e_j$ = jamming signal input
$G_o$ = omni channel gain
$e_t$ = target signal input
$G_j$ = radar antenna gain in direction of jammer
$G_t$ = radar antenna gain in direction of target
$\phi$ = phase of target signal relative to jammer signal.

The AGC operates to make $$e_j G_o = e_j G_j$$

but since the target is in the main beam and the jammer is outside of the main beam $$G_t \gg G_j$$

Thus $e_r$ may differ from $e_o$ in either phase or amplitude by an amount depending on the relative power-gain relationship $$e_j G_j / e_t G_t$$

and on the value of $\phi$. Since no correlation exists between the target and the jammer, $\phi$ will vary randomly from pulse to pulse. The difference in amplitude between $e_o$ and $e_r$ is maximum when $\phi=0$ or whereas the phase difference is maximum and the amplitude difference is near zero with $$\phi = \frac{\pi}{2}$$

or $3\pi/2$. Hence the desired signal always produces an output in the phase detector although some random variations will occur. Although cancellation of jamming signals may be complete, thermal noise from the two channels, being uncorrelated, will add power-wise and the sensitivity of the system will be at least 3 db lower than the radar channel I alone in the absence of jamming. Therefore, provision such as any suitable switching means may be provided to cut out the auxiliary channel when it is not needed.

It will be appreciated that, according to the present invention, it is not necessary to employ elaborate amplifiers to maintain constant phase or high phase fidelity because the only requirement is that the local oscillator feed back loop control the relative phase of the signals going into the phase detector 48 and the intermediate frequency adder 46 up to 180 degrees. Thus, an advantage is obtained over the usual practice in many phase comparison systems such as phase comparison height finders wherein the phase fidelity of the entire system including the mixer, intermediate frequency amplifier, etc., is very critical. Because, however, according to the present invention the maintenance of identical phase characteristics between two channels is not a requirement, but only that the two noise signals cancel or null out, errors as a result of high phase fidelity will not occur.

Obviously many modifications and variations of the present invention are possible in the light of the above teachings. It is therefore to be understood that within the scope of the appended claims the invention may be practiced otherwise than as specifically described.

What is claimed is:

1. In a radar system having a transmitter and a receiver, means for cancelling noise modulated CW signal jamming components comprising:

an omnidirectional signal receiver for receiving noise modulated CW jamming signal components from any direction;
means for combining intermediate frequency signals from the radar receiver and intermediate frequency signals from the said omnidirectional signal receiver for producing an output indicating the difference in phase between noise signals;
control circuit means responsive to said combining means for controlling the intermediate frequency in said omnidirectional signal receiver;
whereby responsive to said control circuit means the noise modulated CW jamming signal components present in each channel are caused to cancel out.

2. Apparatus for cancelling noise modulated CW jamming signals present in a radar receiver comprising:

an omnidirectional receiver including a mixer, local oscillator, and an intermediate frequency amplifier;
said omnidirectional signal receiver having an antenna means capable of receiving noise modulated CW jamming signals from any direction;
means for detecting the difference in phase between the output of the intermediate frequency amplifier for said radar receiver and the intermediate frequency amplifier of said omnidirectional signal receiver;
integrating and oscillating phase control means having an output connected to the intermediate frequency amplifier of said omnidirectional signal receiver and responsive to said means for producing a control voltage for varying the frequency of said intermediate frequency amplifier;
whereby the noise modulated CW jamming components of both said intermediate frequency amplifiers are 180 degrees out of phase due to the frequency shift of said amplifier intermediate amplifiers or said omnidirectional signal receiver.

3. Apparatus for cancelling noise modulated CW signal jamming components of a radar receiver, said radar receiver including a local oscillator, mixer, and an intermediate frequency amplifier, comprising:

an omnidirectional radar signal antenna located in proximity to said radar receiver, said omnidirectional receiver including a local oscillator, an intermediate frequency amplifier and mixer;
phase detecting means responsive to the output of said intermediate frequency amplifier of said omnidirectional receiver and responsive to the intermediate frequency amplifier of the radar receiver for detecting the amount of phase difference between noise modulated CW signal jamming components in said receiver;
control circuit means responsive to said phase detector means for producing a control voltage output having an amplitude of value in correspondence to the amount of difference in phase; and
means coupling said control circuit means to the local oscillator of said omnidirectional signal receiver for changing the frequency thereof;
whereby the frequency of the local oscillator of said omnidirectional receiver is controlled to cause the noise modulated CW components in both said receivers to be in canceling relationship 180 degrees out of phase.

4. In a radar receiver having a mixer, a local oscillator having an output fed to said mixer and an antenna having an output fed to said mixer, and an intermediate frequency amplifier receiving the output of the mixer, means for cancelling noise modulated CW components appearing as jamming signals in said receiver, comprising:

omnidirectional directional receiving means for receiving noise modulated CW components from any direction, said receiver including an antenna, local oscillator, and a mixer for combining the output of the antenna and local oscillator, and an intermediate frequency amplifier for receiving the ouput of the mixer;

phase detector means coupled for the intermediate frequency amplifiers of both said receivers for producing an output corresponding to the amount of phase difference between noise modulated CW components in each of said respective receivers;

control circuit means responsive to the output of said phase detector means for producing a control voltage of value corresponding to the amount of phase difference between said receivers; and means coupling said control circuit means to the local oscillator of said omnidirectional receiving means for controlling the frequency thereof whereby the noise modulated CW components in both of said receivers may be caused to be in cancelation relationship 180 degrees out of phase.

5. The system as defined according to claim 4 but further characterized by a phase detector output means for producing a video output coupled to the said intermediate frequency amplifiers whereby the phase difference of the output signals of the said intermediate amplifiers may be displayed.

6. The system as defined according to claim 4 but further characterized by phase shifting means connected to receive the output of the intermediate frequency amplifier of said omnidirectional receiving means; and means coupling said phase shifting means to said phase detector means, whereby the control voltage produced by said control circuit means regulates the phase of the output of the said omnidirectional intermediate frequency amplifier by controlling the frequency of the local oscillator of the omnidirectional receiving means.

7. The system as defined according to claim 6 but further characterized by said phase shift means comprising a 90 degree phase shifter.

8. The system as defined according to claim 7 but further characterized by means coupling the transmitter of the radar system to said radar receiver and omnidirectional receiver;

automatic frequency control mixing means in each of said receivers for receiving a fractional portion of the radio frequency energy of said transmitter;

means coupling the local oscillator in each of said receivers to each of said automatic frequency control mixing means respectively; and automatic frequency control means responsive to said automatic frequency control mixing means for producing a control voltage output for adjusting the frequency of the respective local oscillators in each respective receiver to prevent frequency drift thereof.

9. The system as defined according to claim 5, but further characterized by automatic gain control means coupled to the intermediate frequency amplifier of said radar receiver and having its output coupled to the intermediate frequency amplifier of said omnidirectional receiver for equalizing the relative gain between said receivers.

10. A noise modulated CW signal cancellation system for radar receiver, said radar receiver having a mixer, a local oscillator having an output fed to said mixer, and an intermediate frequency amplifier receiving the output of the mixer, said noise cancellation system comprising:

an omnidirectional noise modulated signal receiver, said receiver including a local oscillator having an output thereof fed to a mixer, and an intermediate frequency amplifier responsive to the output of said mixer;

phase control means responsive to the output of the respective intermediate frequency amplifiers of each said respective receiver for producing a control voltage output responsive to the difference in phase between noise modulated signal components in each of both said receivers; and means for applying the said control voltage to the said local oscillator of the omnidirectional receiver for varying the frequency of said omnidirectional receiver local oscillator, whereby the noise modulated CW, components appearing in both said receivers are caused to become 180 degrees out of phase for cancellation thereof.

References Cited by the Examiner

UNITED STATES PATENTS 2,825,900  3/58  Collbohm _____ 343—100

FOREIGN PATENTS 720,345  12/54  Great Britain.

CHESTER L. JUSTUS, *Primary Examiner.*